United States Patent
Schneider et al.

[19]

[11] Patent Number: 5,944,159
[45] Date of Patent: Aug. 31, 1999

[54] HYDRAULIC ACTUATING DRIVE

[75] Inventors: Hans-Jürgen Schneider, Stettbach; Robert Seufert, Oerlenbach; Rainer Reuthal, Unterpleichfeld, all of Germany

[73] Assignee: Mannesmann Sachs AG, Schweinfurt, Germany

[21] Appl. No.: 08/972,625

[22] Filed: Nov. 18, 1997

[30] Foreign Application Priority Data

Nov. 20, 1996 [DE] Germany .................... 196 47 940

[51] Int. Cl.⁶ .................................................. F16D 25/12
[52] U.S. Cl. .................. 192/85 C; 192/91 R; 192/85 R; 60/431
[58] Field of Search ................ 192/85 C, 85 R, 192/91 R; 303/11; 60/413, 431, 433

[56] References Cited

U.S. PATENT DOCUMENTS

| 5,105,922 | 4/1992 | Yant | 192/85 R X |
| 5,135,091 | 8/1992 | Albers et al. | |
| 5,631,632 | 5/1997 | Nakashima et al. | |
| 5,733,017 | 3/1998 | Nakashima et al. | 303/11 X |
| 5,743,598 | 4/1998 | Toda et al. | 303/11 X |

FOREIGN PATENT DOCUMENTS

| 42 37 853 | 5/1994 | Germany . |
| 2 296 046 | 6/1996 | United Kingdom . |

*Primary Examiner*—Richard M. Lorence
*Attorney, Agent, or Firm*—Cohen, Pontani, Lieberman & Pavane

[57] ABSTRACT

Hydraulic actuating drive for a clutch, including a control unit, a hydraulic pump which can be driven by a drive and which feeds a pressure accumulator, and an actuating cylinder which is connected via a control valve with the pressure accumulator. The drive of the hydraulic pump is provided with a sensor for detecting the power consumption by the drive, and signals are sent to the control unit so that the hydraulic pump is controllable depending on the power consumption of the drive.

3 Claims, 3 Drawing Sheets

５,944,159

HYDRAULIC ACTUATING DRIVE

BACKGROUND OF THE INVENTION

1. Field of the Invention

The invention is directed to a hydraulic actuating drive, especially for a clutch.

2. Description of the Prior Art

A hydraulic actuating drive is known, for example, from German reference DE 42 37 853 A1, which comprises a hydraulic pump driven by an electric motor. The hydraulic pump delivers hydraulic fluid from a reservoir to a pressure accumulator via a check valve. A pressure sensor is associated with the pressure accumulator and is connected with the supply tank, for safety reasons, by a pressure overload valve which limits the maximum pressure in the pressure accumulator. By means of a control valve which is connected with the pressure accumulator, on the one hand, and with an actuating cylinder, on the other hand, and is switched by means of a control unit, the actuating cylinder is acted upon by pressure. The actuating cylinder is connected with a slave cylinder associated with the clutch via a hydraulic line.

SUMMARY OF THE INVENTION

It is an object of the present invention to provide a hydraulic actuating drive in which the pressure sensor associated with the pressure accumulator can be dispensed with, thereby reducing cost.

Pursuant to this object, and others which will become apparent hereafter, one aspect of the present invention resides in a hydraulic actuating drive having a control unit, a hydraulic pump which can be driven by a drive and which feeds a pressure accumulator, and an actuating cylinder which is connected with the pressure accumulator via a control valve. The drive of the hydraulic pump includes a sensor for sensing the power consumption of the drive. The sensor is operative to send signals to the control unit so that the hydraulic pump is controllable based upon the power consumption of the drive. An economical hydraulic actuating drive is provided by controlling the drive of the hydraulic pump as a function of the power consumption of the drive. It has proven advantageous to provide an electric motor as the drive. The power consumption of the electric motor can be sensed in a simple manner via the motor current by means of a current meter. Such current meters are inexpensive standard components. If the motor current is too high, the power consumption is high. It can be concluded therefore that there is high pressure in the pressure accumulator. In order to be able to make conclusions regarding the pressure in the pressure accunmulator by sensing the motor current, it is necessary to know the characteristic curve of the power consumption of the drive of the hydraulic pump for the quantity delivered by the hydraulic pump or for the counterpressure of the pressure accumulator. These characteristic data can be determined once for a hydraulic pump and for a system and can thereafter be used as a starting point, allowing for variations in manufacture.

A further possibility for indirect sensing of the power consumption of the drive is to measure the rate of rotation or speed of the hydraulic pump. For this arrangement, it is necessary to know the characteristic curve of the speed as a function of the pressure in the pressure accumulator. In an actuating drive of this kind, only one individual sensor is required for continuously ensuring a sufficiently high pressure in the pressure accumulator. That is, the pressure acting upon the pressure accumulator is controlled indirectly via data relating to the hydraulic pump or the drive.

In a further embodiment, a first timer is associated with the hydraulic pump so that it is activated with a predetermined frequency over a time interval which can be determined beforehand. Since every system will always have leakage resulting in a pressure drop in the pressure accumulator, it is necessary to compensate for this leakage by adding hydraulic fluid so that a predetermined minimum pressure can be guaranteed in the pressure accumulator. For this purpose, the worst case, that is, extensive leakage, is always assumed. The leakage is also dependent upon the viscosity of the hydraulic fluid and can depend on the speed of the hydraulic pump. Further, the leakage increases as the counterpressure of the pressure accumulator increases. The viscosity of the hydraulic fluid drops with increasing temperature, so that the value of the hydraulic fluid viscosity must be attached to the maximum temperature that can be reached.

In order to be able to account more precisely for the viscosity of the hydraulic fluid, in another embodiment of the invention, a temperature sensor is provided for determining the temperature of the hydraulic fluid. Accordingly, it is possible to predetermine the minimum speed as a function of the temperature. Further, the assumed leakage can be allowed for depending upon temperature. Accordingly, the control of the timers can also be allowed for in dependence on temperature and can be adapted to or coordinated with the temperature dependence.

In what has turned out to be an advantageous embodiment, the drive of the hydraulic pump is activated in dependence on clutch actuation, so that the pressure drop caused in the pressure accumulator by the clutch actuation is promptly compensated for. In so doing, the pressure drop in the pressure accumulator caused by the clutch actuation need not be compensated immediately, that is, during the clutch actuation. This would require a high-power hydraulic pump and a drive for the same. In a further embodiment, the drive of the hydraulic pump, the hydraulic pump itself, and the pressure accumulator are dimensioned so that the pressure drop in the pressure accumulator brought about by clutch actuation is compensated during an afterrunning time period of the hydraulic pump provided after the actuation of the clutch has been concluded. For this purpose, the selected afterrunning time may not be so long that successive clutch actuations lead to such an extensive drop in pressure in the pressure accumulator that the instantaneous pressure is no longer sufficient for actuating the clutch. The afterrunning time period can also be predetermined at the existing temperature so as to be adapted to the viscosity of the hydraulic fluid.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENT

Figure 1:
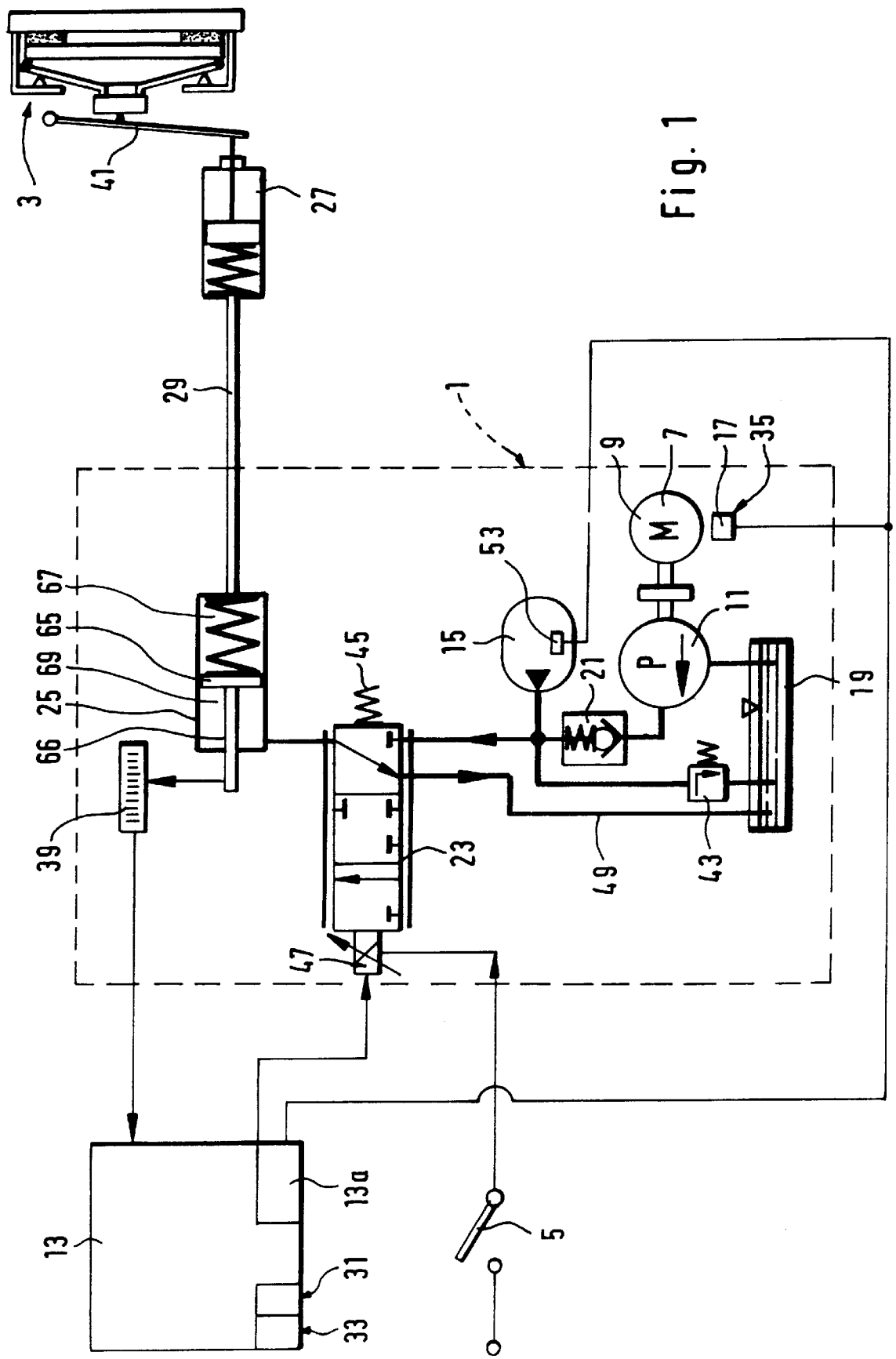
FIG. 1 is a schematic view of an automatic clutch actuation system for a motor vehicle friction clutch with a hydraulic actuating drive pursuant to the present invention.

FIG. 1 schematically shows a friction clutch 3, in this case a friction clutch which is actuated by means of a hydraulic actuating drive 1, arranged between the engine and transmission of a motor vehicle. The clutch release 41 of the clutch is actuated by a hydraulic slave cylinder 27 in the opening direction of the clutch 3. The slave cylinder 27 is connected via a hydraulic line 29 with a hydraulic actuating cylinder 25 whose cylinder chamber is divided by a piston 65 into a transmitting space 67 and a work space 69. The pressure in the transmitting space 67, and accordingly in the slave cylinder 27, is determined by the pressure in the work space 69. By varying the pressure in the work space 69, the position of the clutch release 41 of the clutch 3 can be alternated between a position in which the clutch 3 is completely open and a position in which the clutch is completely closed.

The clutch 3 is opened and closed automatically by means of a control unit 13 corresponding to the operating situation of the motor vehicle when starting as well as when shifting gears of the motor vehicle transmission, which is not shown in more detail. For this purpose, the control unit 13 responds to a signal from a displacement sensor 39, which signal represents the instantaneous position of a piston rod 66 of the piston 65 and accordingly the instantaneous position of the clutch release 41 of the clutch 3. Via a control valve 23, the control unit 13 controls the pressure in the work space 69 of the actuating cylinder 25 in a volume-proportional manner with respect to the desired position of the clutch release 41. The control valve 23, which is a 3/3-way proportional valve in the illustrated embodiment, is pretensioned by means of a return spring 45 into a position connecting the work space 69, via a return line 49, with a supply tank 19 for hydraulic fluid, as is shown in FIG. 1. When an electromagnetic actuating member 47 is excited, the control valve 23 is opened entirely or partially corresponding to the exciter current, wherein it connects the work space 69 with a pressure accumulator 15. The degree to which the control valve 23 is opened is controlled by the control unit 13 so that a desired reference position of the clutch release 41 is maintained corresponding to the driving situation of the motor vehicle. The pressure accumulator 15 is connected, via a check valve 21 which opens in the pressure direction of a hydraulic pump 11, with the hydraulic pump 11 which delivers the hydraulic fluid from the supply tank 19 and is driven by an electric motor 9. When it is first put into operation, the pressure accumulator 15 is acted upon by pressure during a startup time 55. The electric motor 9 is supplied from the onboard power supply of the motor vehicle and is driven by the control unit 13 so that the hydraulic pressure in the pressure accumulator 15 is maintained between given limits. The hydraulic pressure is determined indirectly by means of the control unit 13. The control unit 13 determines the pressure prevailing in the pressure accumulator 15 by means of the motor current or the speed of the hydraulic pump 11. A pressure overload valve 43, which is connected with the output side of the hydraulic pump 11 and leads back to the supply tank 19, protects the hydraulic system from pressure overload.

In the normal case, the clutch 3 is controlled automatically by the control unit 13. In order to be able to use the motor vehicle in spite of a defect in the control unit 13 or in one of its sensors at the expense of reduced convenience, the control valve 23 can be excited via an emergency actuating switch 5. When the switch 5 is open, the control valve 23 is in the position shown in FIG. 1 and the clutch 3 is completely closed. When the switch 5 is closed, the control valve 23 is switched into a completely open position, wherein the pressure in the work space 69 increases and the clutch 3 is completely opened.

Figure 2:
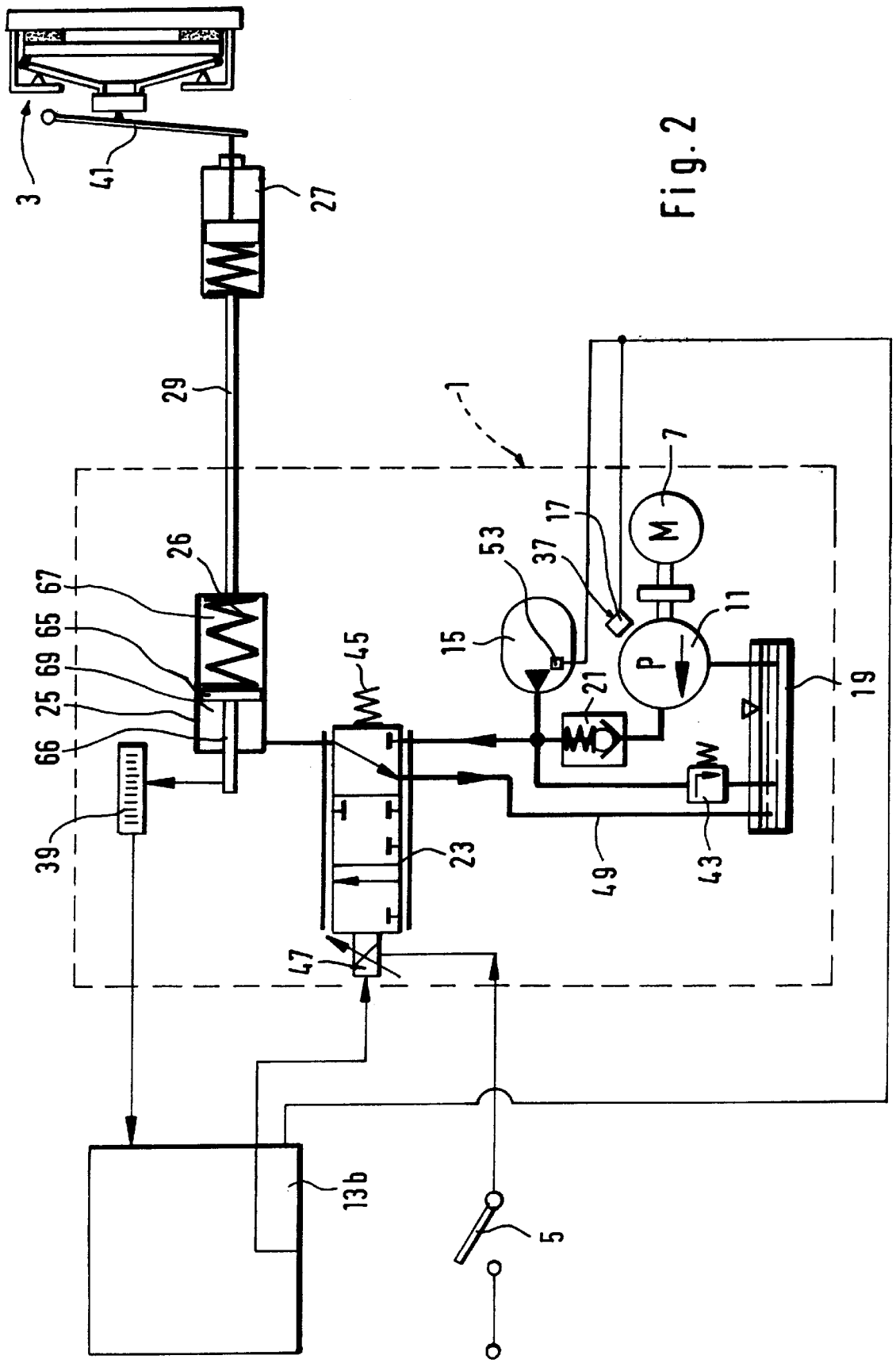
FIG. 2 is a schematic view of an automatic clutch actuation system for a motor vehicle friction clutch with another embodiment of a hydraulic actuating member.
Figure 3:
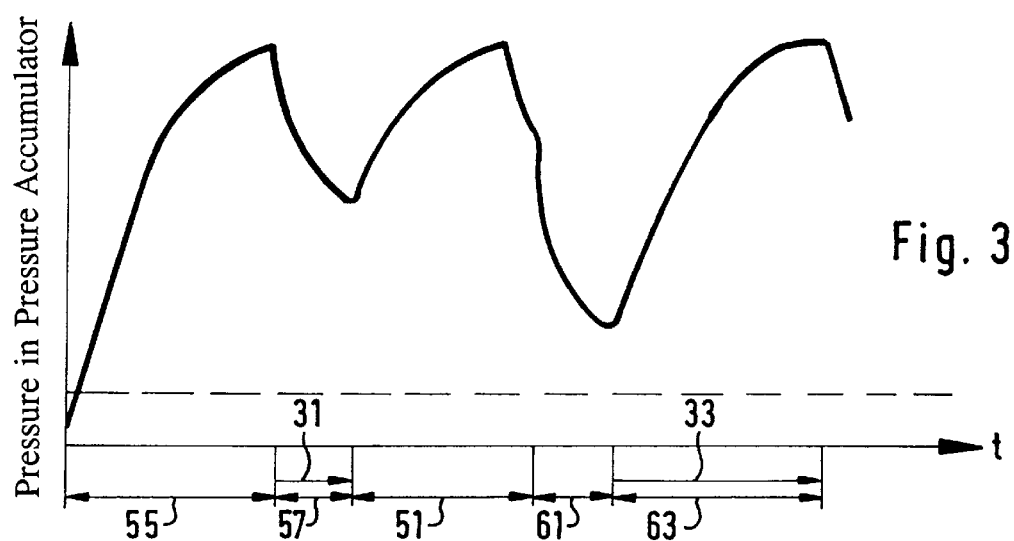
FIG. 3 is a diagram showing the pressure in the pressure accumulator plotted over time.
Figure 4:
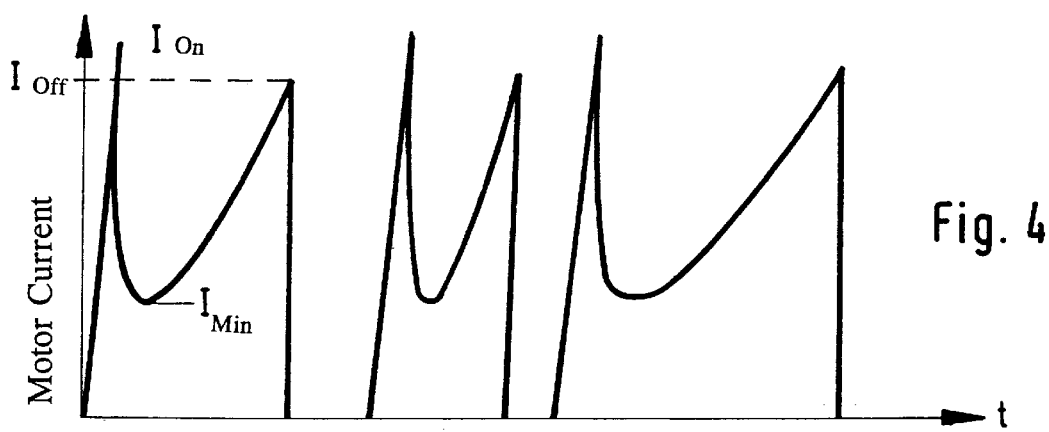
FIG. 4 is a diagram showing the motor current plotted over time.
Figure 5:
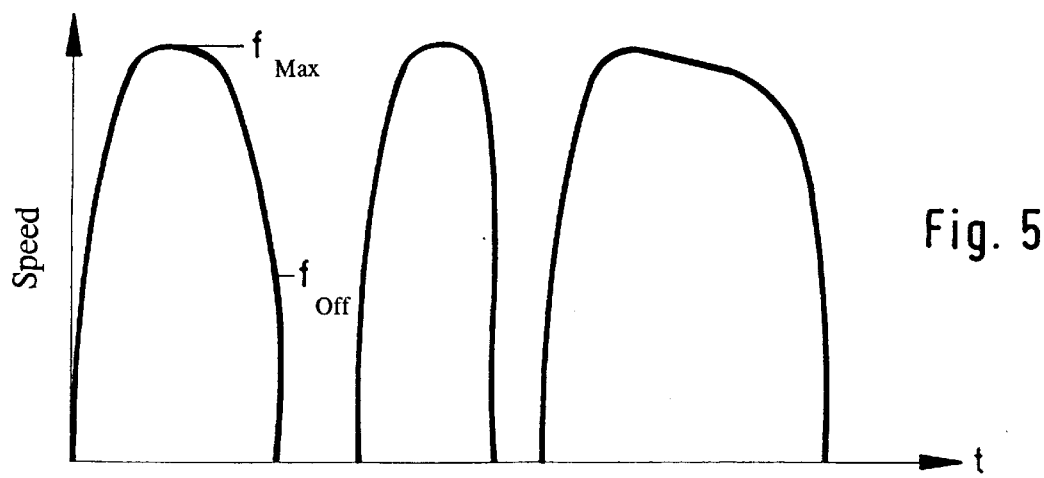
FIG. 5 is a diagram showing the speed plotted over time.

Two different embodiments are shown in FIGS. 1 and 2. FIGS. 3 and 4 rotate to the first embodiment and FIGS. 3 and 5 relate to the second embodiment.

In the embodiment shown in FIG. 1, the application of pressure is controlled by a current meter 35 which is associated with the electric motor 9 acting as a drive 7. The motor current of the electric motor 9 is sensed by a sensor 17 of the current meter 35. The obtained current values are sent to the control unit 13a and the electric motor 9 is driven, that is, turned on or turned off, by the control unit 13a depending on these values.

The electric motor 9 is then switched on. A high current $I_{on}$ is required at first when starting the hydraulic pump 11. However, these high current values drop quickly to a maximum of $I_{min}$. As pressure increases in the pressure accumulator 15, the current required by the electric motor 9 increases again. The characteristic line of current consumption of the electric motor in relation to pressure in the pressure accumulator 15 is stored at least partially in the control unit 13a. When the threshold value $I_{off}$ is reached after passing through a minimum current consumption, the information that the desired minimum pressure has been reached in the pressure accumulator 15 is present in the control unit 13a, and the electric motor 9 of the hydraulic pump 11 is turned off by the control unit 13a.

The electric motor 9 can be switch on again on the one hand by a clutch actuation performed by the driver and, on the other hand, after the expiration of a predetermined interval 57.

In the one case, the electric motor 9 is activated by the clutch actuation so that the pressure drop in the pressure accumulator 15 caused by the clutch actuation is compensated for. When $I_{off}$ is reached, the electric motor 9 is switched off again. It is also possible to switch on the electric motor 9 by presetting an afterrunning time period 63 with the clutch actuation and allowing the electric motor 9 to continue running during this fixed afterrunning time period 63 after the clutch actuation is concluded. The afterrunning time period 63 is selected so that the pressure drop 61 caused in the pressure accumulator 15 by the clutch actuation is compensated for.

In the other case, a time interval 51 which is begun by switching off the electric motor 9 is started by the control unit 13a and the electric motor 9 is switched on at the end of this time interval, as measured by a first timer 31. Every time the electric motor 9 is switched off, a resetting of the interval is carried out so that the interval is started anew. When a current consumption of $I_{max}$ is sensed after the starting process of the electric motor 9 is carried out, the electric motor 9 is switched off again by the control unit 13a. The switching off can also be controlled by a presetting of the time interval by means of the control unit 13a. After the electric motor 9 is started, it is switched off again after the fixed time interval 57. In this respect, the preset time interval 57 is selected so that the pressure drop caused by leakage is compensated and at least the desired pressure exists in the pressure accumulator 15 in every case. When the clutch is actuated, while the electric motor 9 is in operation for compensating for leakage and the operating period is regulated over a given time interval and a given afterrunning time period 63, as measured by a second timer 33, the remaining amount of time of time interval 57 is added to the afterrunning time period 63. A maximum pressure in the pressure accumulator 15 is given by the pressure overload valve 43. A temperature sensor 53 is provided to sense the temperature of the hydraulic fluid in the pressure accumulator 15. The temperature sensor 53 is connected to the control unit 13a so that the frequency and time interval 51 can be predetermined depending on the temperature of the hydraulic fluid.

The embodiment example shown in FIG. 2 has no current meter 35, but rather a speed sensor 37 for determining the speed of the hydraulic pump 11. The control unit 13b of the drive of the hydraulic pump 11 is very similar to the control unit 13a described above. The drive 7 of the hydraulic pump 11 is switched on by the control unit 13b. The speed of the hydraulic pump 15 increases to a maximum speed $f_{max}$, provided the output pressure in the pressure accumulator 15 is not too high. As pressure increases in the pressure accumulator 15, the speed of the hydraulic pump 11 decreases. When the control unit 13b receives the speed value $f_{off}$ after passing a maximum frequency, it turns off the drive 7 of the hydraulic pump 11. The characteristic line of the speed of the hydraulic pump 11 in relation to the prevailing pressure in the pressure accumulator 15 is stored at least in part in the control unit 13b. The value of frequency $f_{off}$ is consequently fixed at a value at which the desired pressure in the pressure accumulator 15 is achieved in every case. The switching on and switching off is effected by the control unit 13b in exactly the same way as in the control unit 13a as described above with reference to the first embodiment.

The invention is not limited by the embodiments described above which are presented as examples only but can be modified in various ways within the scope of protection defined by the appended patent claims.

We claim:

1. A hydraulic actuating drive for a clutch, comprising:
   a hydraulic pump;
   a control unit for controlling the hydraulic pump;
   a pressure accumulator in fluid communication with the hydraulic pump;
   drive means for driving the hydraulic pump;
   an actuating cylinder connected to the pressure accumulator;
   a control valve connected between the actuating cylinder and the pressure accumulator;
   sensor means for detecting power consumption of the drive means and for sending corresponding signals to the control unit whereby the hydraulic pump is controllable as a function of power consumption of the drive means;
   a first timer associated with the hydraulic pump for actuating the hydraulic pump at a given frequency over a determinable time interval; and
   temperature sensor means associated with the control unit for determining a hydraulic fluid temperature so that the given frequency and the time interval can be predetermined depending on the temperature of the hydraulic fluid, an afterrunning time period of the drive means of the hydraulic pump being dependent upon hydraulic fluid temperature.

2. A hydraulic actuating drive according to claim 1, and further comprising a second timer operatively arranged to determine the afterrunning time period of the clutch, the drive means for the hydraulic pump being operated after a conclusion of a clutch actuation in the afterrunning time period.

3. A hydraulic activating drive according to claim 1, and further comprising a displacement sensor connected to the control unit and operatively arranged to detect displacement of a piston of the actuating cylinder.

* * * * *